United States Patent [19]
Terry

[11] 3,891,493
[45] June 24, 1975

[54] APPARATUS FOR SLITTING POSITIONING AND WRAPPING TUBULAR OBJECTS

[75] Inventor: Rupert Douglas Terry, Toledo, Ohio

[73] Assignee: Johns-Manville Corporation, Denver, Colo.

[22] Filed: Jan. 22, 1973

[21] Appl. No.: 325,698

Related U.S. Application Data

[62] Division of Ser. No. 137,356, April 26, 1971, Pat. No. 3,755,039.

[52] U.S. Cl. .............. 156/455; 156/457; 156/516; 156/571; 156/578
[51] Int. Cl. ........................ B31c 5/00; B65h 81/00
[58] Field of Search ........... 156/184, 185, 187, 191, 156/192, 215, 218, 256, 259, 446, 447, 448, 156/449, 450, 455, 458, 510, 517, 571, 156/578, 457; 138/149

[56] References Cited
UNITED STATES PATENTS

| | | | |
|---|---|---|---|
| 2,621,823 | 12/1952 | Perry | 156/215 |
| 3,063,887 | 11/1962 | Labino | 156/187 |
| 3,121,253 | 2/1964 | Varrial | 156/455 |
| 3,247,044 | 4/1966 | Pechmann | 156/447 |
| 3,347,725 | 10/1967 | Stephens et al. | 156/184 |
| 3,580,790 | 5/1971 | Pollmeier et al. | 156/458 |
| 3,658,614 | 4/1972 | Beck | 156/187 |
| 3,695,965 | 10/1972 | Current et al. | 156/447 |
| 3,755,039 | 8/1973 | Terry | 156/187 |

*Primary Examiner*—Charles E. Van Horn
*Assistant Examiner*—Basil J. Lewris
*Attorney, Agent, or Firm*—Robert M. Krone; John D. Lister

[57] ABSTRACT

Tubes are contacted by belts on the upper portion of their outer surface to advance the tubes along a path paralleling their longitudinal axes with the lower well being slit and a guide subsequently being engaged to position the tube with its slot paralleling an edge of a sheet of jacketing material advanced toward the tube and positioned adjacent thereto whereby belts acting normal to the path of the tubes contact the upper portion of their outer surface to roll the tubes about their longitudinal axes to engage the sheet jacketing material wrapping it about the tube being rolled thereover.

4 Claims, 9 Drawing Figures

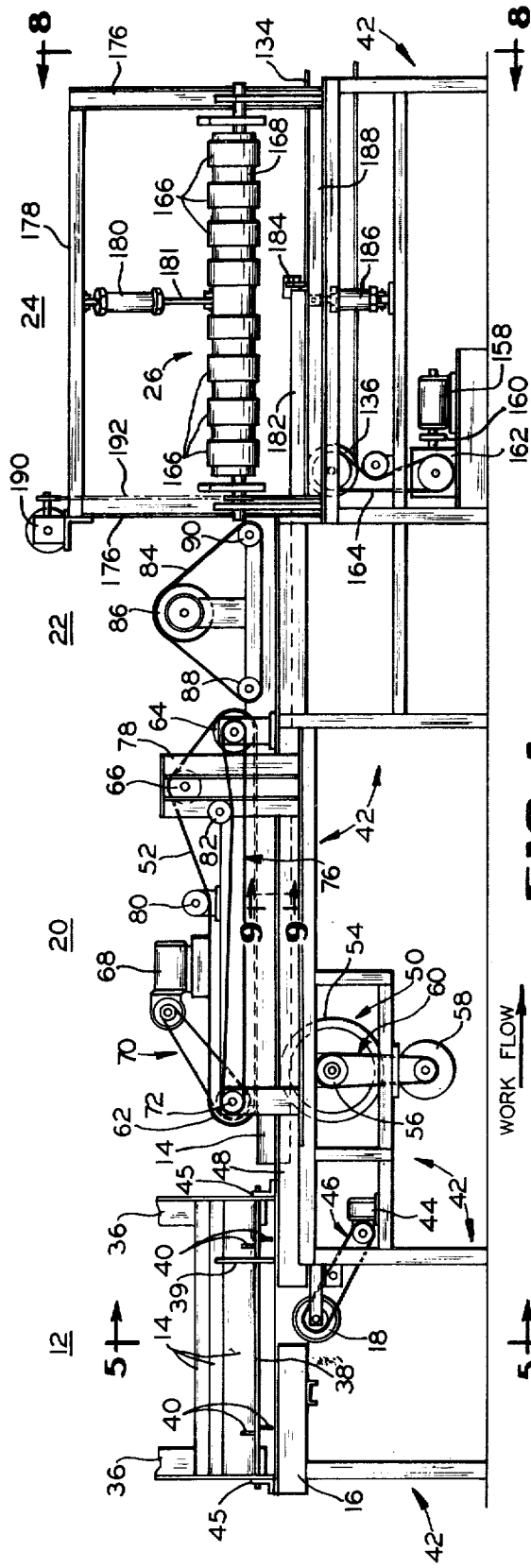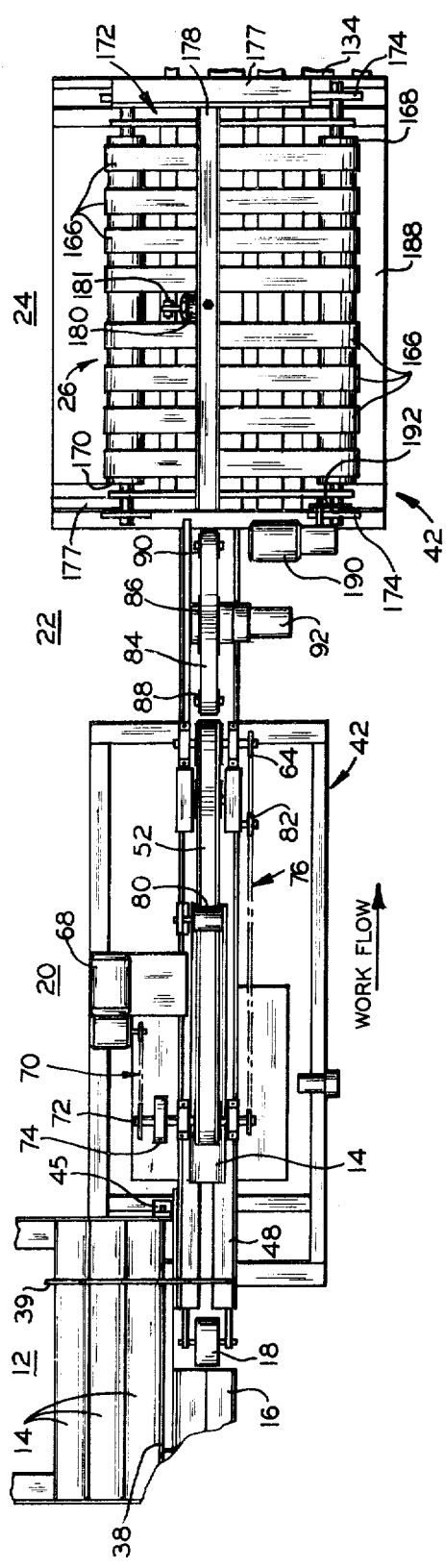

APPARATUS FOR SLITTING POSITIONING AND WRAPPING TUBULAR OBJECTS

This is a division of application Ser. No. 137,356, filed Apr. 26, 1971 and now U.S. Pat. No. 3,755,039.

BACKGROUND OF THE INVENTION

Heretofore jacketing has been applied to tubes of fibrous, thermal insulation by manually wrapping the tubes with jacketing having adhesive on the surface thereof adjacent the tube when the tube was previously slit along its length.

One product resulting from the practice of the method and operation of the apparatus of this invention is the subject of U.S. patent application Ser. No. 003,638 for "Self-Seal System for the Installation of Insulation" by John Paul Mikulak which was filed prior to this application and has the same assignee as this application.

A method and apparatus for wrapping jacketing about unslit tubes of insulation and subsequently slitting the wrapped tubes is the subject of U.S. patent application Ser. No. 003,598 for "Method and Apparatus for Feeding and Wrapping Sheet Material" which was also filed prior to this application and is now U.S. Pat. No. 3,695,965.

With a previously slit tube, the jacketing material had to be manually aligned with one edge of the material adjacent and parallel to the slit prior to wrapping the jacket to properly align the jacket to the tube. Subsequently, the tube was rolled across the sheet so that the tacky adhesive on the surface of the jacketing material caused the jacketing material to be picked up and bonded to the tube. Manual operations of this nature are slower than the time required for manufacture of smaller diameter tubes which can be manufactured at rates approaching one every 4 to 5 seconds. As a result, the production of wrapped tubes is slowed down by a time consuming manual operation and can only be achieved by an increase in the amount of manual labor with accompanying high labor costs and additional working area.

The present invention involves a method of and apparatus for automatically slitting and jacketing cylindrical bodies at a rate approximately the production rate of the cylindrical bodies with a resultant reduction in labor, inhancement of material flow in a plant, an increase in production speed and a reduction in production cost as well as the required production area required.

Sheets of jacketing material cut to suitable length for encompassing cylindrical bodies and the cylindrical bodies are indexed by indexing means at a first station to align an edge of the sheet jacketing material with the longitudinal axis of the cylindrical bodies. Means which can be in the form of dormant adhesive on the surface of the sheet jacketing material and a spray for activating the adhesive cause a portion of the outer peripheral surface of the cylindrical bodies to adhesively contact the edge of the sheet jacketing material. With the cylindrical bodies having been slit and circumferentially oriented in advancing to the first station, the cylindrical bodies are in proper alignment to be rotated about their longitudinal axes to wrap the jacketing material about the outer peripheral surface of the cylindrical bodies. Apparatus is provided to advance the sheets linearly from the stack to a station in which the tacky surface is prepared and in one embodiment to confine the region which is tacky to less than that required to encompass the entire outer surface of the cylindrical bodies. Also, apparatus is provided to advance the cylindrical body linearly from a supply source to a station where it is slit, all the while maintaining the circumferential orientation of the body as it is advanced to alignment with the sheet material by use of guide means which in one embodiment is a combination of a fixed and retractable edge guide.

In one embodiment of the invention particularly applicable to pipe insulation, the body and sheet material consist of a jacketed tube having a region of jacketing which is not adhered to the tube to expose a slot in the tube wall. The exposed slot affords a means of slipping the jacketed tube over a pipe for insulation purposes. A flap or tab of jacketing material having no tacky surface loosely over the slot to provide a seal once the tube is placed over a pipe by activation of the adhesive on the tab at that time.

The above apparatus provides an automatic wrapping and slitting of cylindrical bodies with sheet material aligned with the slot in the body and, if desired, an extending tab which may later be used to seal over the slot. The method developed for use with the machines has resulted in an increase in production over previous manual operations. The apparatus has eliminated the need for a manual operation with the resulting savings in labor and work area required.

BRIEF DESCRIPTION OF THE DRAWINGS

FIG. 1 is a fragmentary elevational view of a portion of a manufacturing line including apparatus embodying the features of the invention for automatically wrapping jacketing material on slit tubes;

FIG. 3 is a top view of the apparatus illustrated in FIG. 1;

DESCRIPTION OF THE PREFERRED EMBODIMENT

Figure 2:
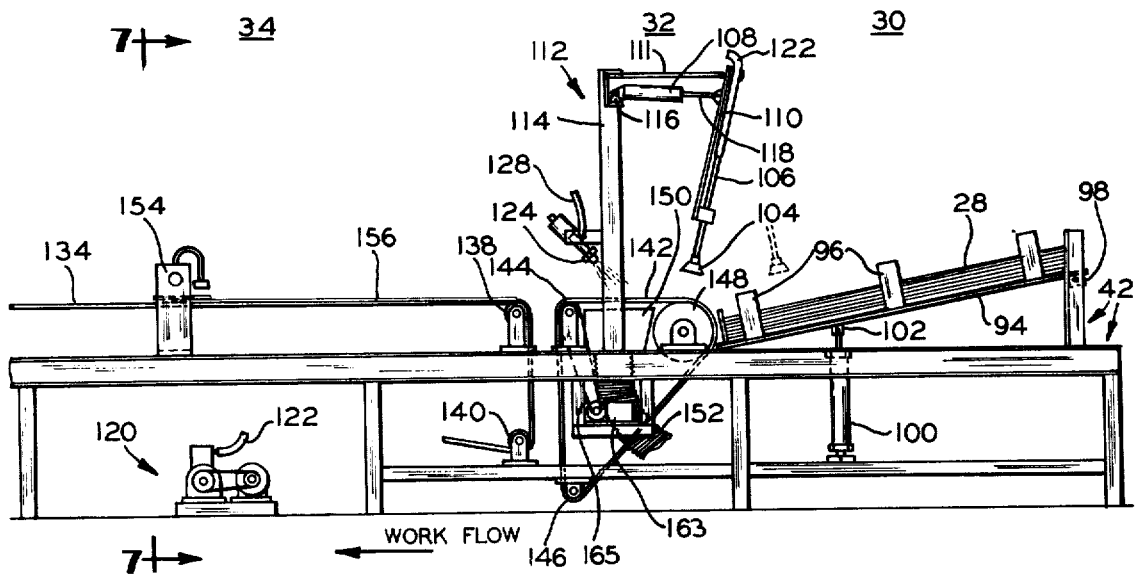
FIG. 2 is a fragmentary elevational view of a continuation of the manufacturing line illustrated in FIG. 1.

The present apparatus and method involves slitting and wrapping a cylindrical body with a sheet of jacketing material adhered to a portion or the entire outer surface of the body without an adhered portion of the jacketing covering over the slot in the body. In the preferred embodiment, the cylindrical body is formed of a tubular mass of thermally insulating material to adapt it for pipe insulation. The jacketing is formed of a sheet material which can function as a vapor barrier for pipe insulation although flexible sheet material having differing physical and chemical characteristics may be applied by the techniques and apparatus to be described.

Typically the cylinder to be jacketed is formed of a fibrous insulating material which most commonly is formed of glass fibers produced by passing molten glass through small orifices in pots containing the molten glass to produce a plurality of glass filaments. The filaments are subjected to hot gaseous blasts which soften and attenuate them into small lengths of individual fine fibers. The fibers are collected on a moving formation conveyor and a binder, typically a thermosetting resin, is introduced into the mat. The mat can be formed into cylinders by being cut into lengths corresponding to the length of the total number of convolutions to be employed in the cylinder and then wrapped around and compressed upon a mandrel to form the cylinder having the desired inner and outer diameter and density.

Alternatives to the above glass fibers, formed as described, can be employed for thermally insulating tubes. These include other materials which can be fiberized as by spinning, drawing, attenuating and blowing into fine diameter fiber. Such material as silicates of metal oxides, such as rock wools from argillaceous matter or shale, slag wool from metallurgical slags, the commonly known "mineral wools," aluminum silicate fibers and any fibers of the so-called glasses can be formed into suitable cylinders.

The jacketing of flexible sheet material can be of various forms, depending upon its intended function. In the example of thermal insulation jacketing a composite sheet of an outer layer of paper, an intermediate reinforcing web of glass fibers, and an inner layer of aluminum foil is employed. The jacketing is coated on the metal foil face with an adhesive, advantageously of the phenolic neoprene type having the characteristics that it is inexpensive, can be applied in controlled quantities, is dormant or not tacky, is flexible, is nonflammable and is readily activated. A typical activator for the adhesive is a suitable solvent such as trichloroethane or methyl chloroform.

Jacketing sheets can be prepared from rolls of material, precoated with adhesive conditioned to a non-tacky state, by cutting sheets of jacketing of a length exceeding the circumferential length of a cross section of the tube to be jacketed by an amount providing on adequate sealing tab and a width substantially equal to the longitudinal dimension of the tube. Such sheets can be employed individually slthough automated jacketing is facilitated if they are collected in stacks.

Referring to the drawings, FIGS. 1 through 4 illustrate one embodiment of the invention in the form of manufacturing line wherein the major components consist of an inclined ramp 12 for periodically feeding tubes 14 into a trough 16 where a forwarding wheel 18 advances the tubes one at a time to a slitter station 20. In passing through the slitter station 20, the tubes are cut through the lower wall and partially on the inside of the upper wall. A guide 53, illustrated in FIG. 9, in a transfer station 22 (see FIG. 1) maintains the orientation of the tube 14 as travel continues on into a wrapping station 24. A retractable guide 182 (illustrated in FIG. 8) within the wrapping station 24 maintains the orientation of the tube 14 until the tube 14 is engaged by a swingable belt conveyor 26 capable of being lowered upon the tube 14. At the same time, the retractable guide 182 is caused to be lowered downwardly away from the tube 14 to enable rolling of the tube 14 to occur when the conveyor 26 contacts the outer peripheral surface of the tube 14.

Figure 4:
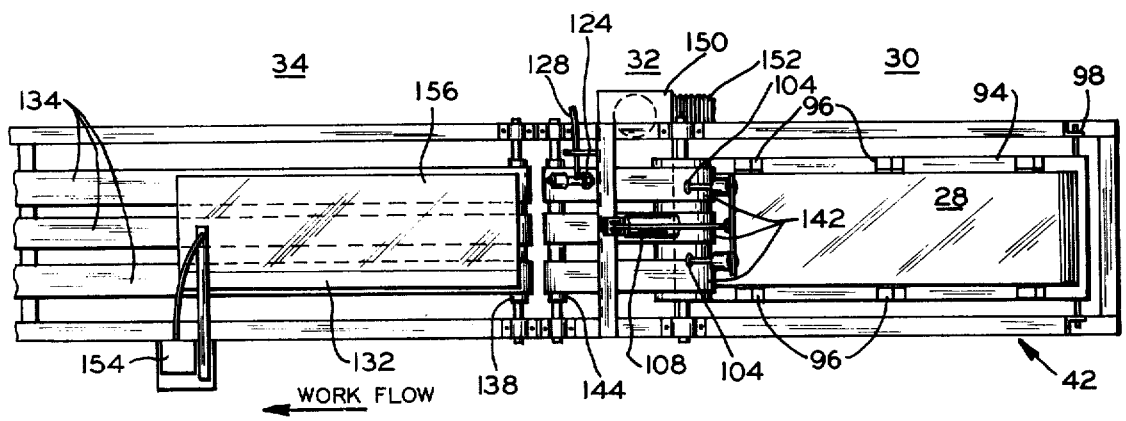
FIG. 4 is a top view of the apparatus illustrated in FIG. 2.

Simultaneous with the advance of the tube 14 to the wrapping station 24 is the movement of the jacketing 28, made of sheet material, from a stacking station 30 in a direction opposite to that of the movement of the tubes 14 (see FIGS. 2 and 4). Individual sheets of jacketing 28 are advanced and the adhesive on the upper face is activated at a pickup-spray station 32. The jacketing 28 is advanced to a jacketing conveyor 34 which spans both the wrapping station 24 and the pickup-spray station 32. The jacketing conveyor 34 carries the individual sheets of jacketing 28 through a dwell portion between the wrapping and pickup-spray stations 24 and 32 and on into the wrapping station 24. The dwell portion gives the previously sprayed activator on the sheet time to activate the adhesive which as a result becomes tacky. Upon entering the wrapping station 24, one edge of the sheet of jacketing 28 is aligned adjacent and parallel to the slot formed in the tube 14, and opposing edges of the sheet align with respective ends of the tube 14. When the tube 14 is rolled over the sheet of jacketing 28, as described above, the tacky surface causes the jacketing 28 to wrap around the tube 14 in alignment with the slot in the tube 14 and the ends thereof.

From the above overall description of the line, it is apparent that work flow to the line originates at both ends thereof and moves toward the wrapping station 24 which discharges work by a motion transverse to that of the line. In describing the above line, it will be advantageous to describe the components associated with each of the three work flows separate from the rest of the line.

Figure 5:
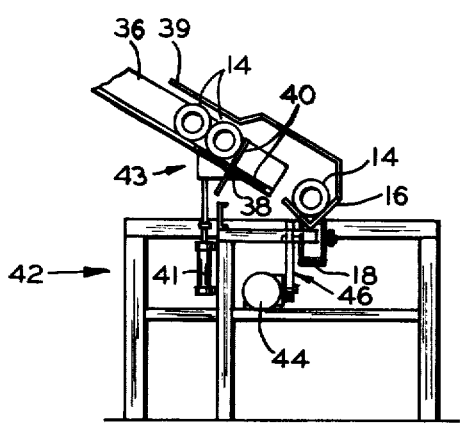
FIG. 5 is a sectional view of the apparatus illustrated in FIG. 1 taken along the line 5—5 thereof.

First, consider the work flow with respect to the tubes 14 which involves the components of the inclined ramp 12, trough 16, forwarding wheel 18, slitter station 20 and transfer station 22. These components are illustrated in FIGS. 1 and 3. The inclined ramp 12 is additionally illustrated in FIG. 5 and consists basically of a pair of structural angles 36 suitably framed with structural steel base 42. It will be noted that the base 42 extends over the entire line to support all the components as well as the inclined ramp 12. The inner legs of the angles 36 oppose each other while the other legs form side guides for the tubes 14 resting between them on the inner legs. The ramp 12 is inclined to the horizontal to encourage the tubes 14 thereon to roll toward a feeder bar 38. Fingers 40 on the feeder bar 38 located near the extremities of the length of the bar 38 are spaced radially at 90° intervals around the bar 38. Each time the bar 38 is rotated 90°, a finger 40 at each end of the bar 38 engages the tube 14 adjacent it and flips it over the bar 38 into the trough 16. Energization of the feeder bar 38 is accomplished by an air cylinder 41 connected to a rack and pinion box combination 43. The bar 38 is pivotally mounted in pillow block bearings 45 on the base 42. To guide the tubes 14 into the trough 16, a retainer bar 39 is provided which extends over the inclined ramp 12.

Clearly, other means of supplying the line could be employed such as means for vertically stacking the tubes 14 above the trough 16 for release one by one. In like sense, the inclined ramp 12 could be hydraulically actuated with respect to the feeder bar 38 and the bar 38 itself could be replaced also, for example, by an orifice and gate.

Located adjacent the inclined ramp 12, the trough 16 is of "V" shape to receive the tubes 14 fed from the ramp 12. Support for the trough 16 is achieved by a structural tie to the inclined ramp 12. In between the trough 16 and the slitter station 29, a forwarding wheel 18 is rotatably mounted and continuously driven by a motor-reducer 44 through chain and sprocket set 46. A similar "V" shaped open trough 48 extends from the slitter station 20 toward the forwarding wheel 18 and is aligned with the trough 16 tube in effect, a continuation of trough 16. The open trough 48, unlike trough 16, does not have an apex at the bottom so that the tubes 14 therein are exposed for slitting purposes. The overhang of the open trough 48 and trough 16 span the face of the inclined ramp 12 to give support over the full length of each tube 14 deposited into the troughs 16 and 48. With the forwarding wheel 18 located intermediate of the two troughs 16 and 48, a vertical height alignment of the upper periphery of the forwarding wheel 18 is slightly above the rest position of the bottom of a tube 14 within the troughs 16 and 48 allows the tube 14 to be driven by the forwarding wheel 18. When a tuube 14 is released from the inclined ramp 12 into the troughs 14 and 48, it is immediately advanced by the continuously running forwarding wheel 18 to the entry end of the slitter station 20. If the slitter station 20 is not in a condition to accept a tube 14, the tube 14 will be stopped at the entry to the slitter station 20 and the forwarding wheel 18, which continues to run, is allowed to slip beneath the tube 14 thereby maintaining the tube 14 against the entry of the slitter.

Apparatus in the form of troughs 16 and 48 plus a forwarding wheel 18 have been described as illustrated in the drawings of the preferred embodiment but other means could be used to advance the tubes released from the inclined ramp 12 to the entry of the slitter station 20. One example of an alternative is a driven set of rollers in place of the troughs 16 and 48 and wheel 18.

Basic components of the slitter station 20 are the open trough 48 which continues over the length of the station 20, the slitter saw 50, the pressure belt 52 and fixed guide 53. The saw 50 includes a continuously rotating circular blade 54, which may or may not have teeth, and of sufficient diameter to pass through the bottom wall of a tube 14 and a portion of the inner wall of the tube diametrically opposed to the slit. The blade 54 is positioned between the opening in the open trough 48 to engage tubes 14 passing thereover. A suitable bearing mounting 56 for the blade 54 is attached to the base 42 and a motor 58 is used to drive it through a belt and sheave combination 60. To positively orient and advance a tube 14 through the slitter station 20 a pressure belt 52 is driven counter clockwise as viewed in FIG. 1. Engagement of the tube 14 and belt 52 occur at the top surface of the tube 14. A high coefficient of friction of the belt surface contacting the tube 14 prevents slippage between the tube 14 and the belt 52. Further, the clearance between the belt 52 and open trough 48 is slightly less than that required by the O.D. of the tube 14 so that engagement between the belt 52 and tube 14 causes compression of the tube 14, within its elastic limits, thereby pressing the tube 14 against the belt 52 for firm contact. Movement of the belt 52 and, therefore, advancement of the tube 14 is caused by rotation of drive pulleys 62 and 64 and an associated idler pulley 66 over which the bolt 52 passes in forming a continuous loop. Mounted on the base 42 is a motor-reducer 68 for driving the drive pulley 62 through a chain and sprocket combination 70. On the rotatable shaft 72 supporting the drive pulley 62 a magnetic clutch 74 is mounted for selectively engaging and disengaging the pulley 62 from the continuously running motor-reducer 68 to stop and start the pressure belt 52. Drive pulley 64 is driven by the interconnecting chain and sprocket loop 76. Adjustment of tension on the pressure belt can be accomplished by either adjusting the idler pulley 66 within its takeup block 78 or by tension pulley 80 or both. A tension sprocket 82 is placed on chain loop 76 to maintain tension on the loop 76. To guide the tubes 14 and retain their proper circumferential orientation through the slitter station 20, a guide 53, illustrated in FIG. 9, in the form of a strip of metal centered with a longitudinal edge pointing upward within the opening of the open trough 48 extends up into the trough 48 downstream of the slitter saw 50 to engage the tubes 14 by entering the slot formed therein by the saw 50.

The guide 53 within open trough 48 continues over the length of the transfer station 22 as does the trough 48. Support for both trough 48 and guide 53 as well as the transfer belt 84, is provided by the base 42. The transfer belt 84 duplicates the pressure belt 52 in operation and serves as a feed mechanism for the wrapping station 24. Since the transfer belt 84 has a smaller loop than the pressure belt 52, the supporting components are less elaborate having simply one drive pulley 86 and two idler pulleys 88 and 90. The drive pulley 86 is connected to motor-reducer 92. Both the transfer belt 84 and pressure belt 52 are cycled together to start and stop at the same time thereby providing a smooth advance of the tubes 14 through each station 20 and 22. The firm contact between the tubes 14 and transfer belt 84 along with the guide 53 in trough 48 combine to deliver the tubes 14 in proper alignment to the wrapping station 24.

Attention will now be turned to those components for the transfer of jacketing 28 to the wrapping station 24, namely, the stacking station 30, pickup-spray station 32 and jacketing conveyor 34 illustrated in FIGS. 2 and 4.

Figure 6:
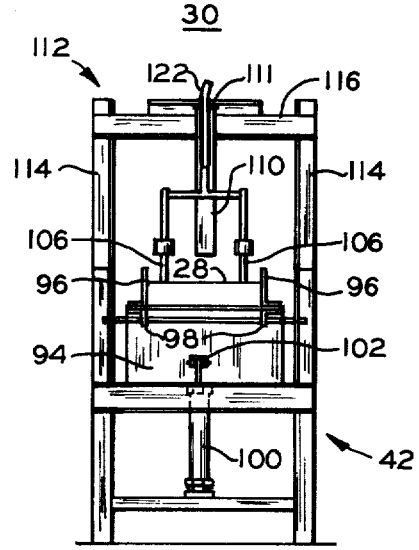
FIG. 6 is a right hand end view of the apparatus illustrated in FIG. 2.

The jacketing 28, in the form of sheet material precut to size and having non-tacky adhesive on one major surface thereof, is stacked with the adhesive facing upward on the stacking station 30. A flat metal pipe 94 having fixedly attached side guards 96 is pivotally connected, as at 98, to the base 42 to form a swingable stacking station 30 as illustrated in FIGS. 2, 4 and 6. An air cylinder 100 is pivotally connected to the base 42 beneath plate 94 and to the plate 94 by a cylinder rod clevis 102. Energization of the cylinder 100 raises the end of the stack of jacketing 28 adjacent the jacketing conveyor 34 to enable the vacuum cups 104 of the pickup-spray station 32 to engage the top sheet of jacketing 28 on the stack.

To enable the vacuum cups 104 of the pickup-spray station 32 to advance the top sheet of jacketing 28 onto the jacketing conveyor 34, both the cups 104, illustrated in FIG. 2, and the non-flexible vacuum tubes 106 are attached to an air cylinder 108 through a mounting 110 pivotally attached to plates 111 on a structural bridge 112 including spaced apart vertically extending columns 114 and an interconnecting angle 116 which in turn are supported by the base 42. The cylinder 108 has its base pivotally mounted to an angle 117 so that as the cylinder rod 118 moves in and out, the vacuum cups 104 are swung in an arc spanning the end of the jacketing conveyor 34 and the stacking station 30. Pickup and release of the jacketing 28 by the cups 104 is accomplished through activation and deactivation of the vacuum on the cups 104 furnished by a vacuum pump 120. Freedom of motion for swinging of the cups 104 is enhanced by the flexible vacuum line 122 interconnecting the pump 120 and the vacuum tubes 106.

Figure 7:
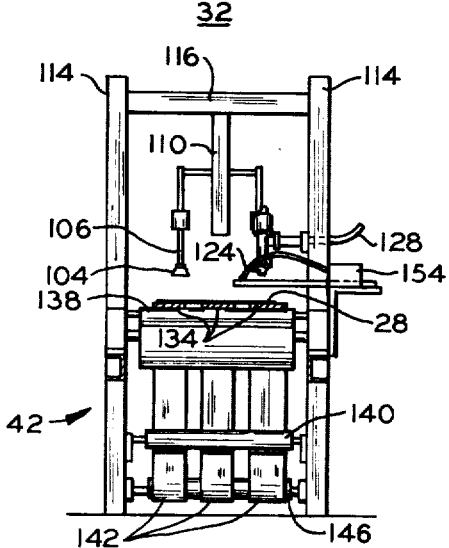
FIG. 7 is a sectional view of the apparatus illustrated in FIG. 2 taken along line 7—7 thereof.

Mounted on the structural bridge 112 on the opposite side from the vacuum cups 104 is a spray system, illustrated in FIG. 7 as well as FIGS. 2 and 4, capable of applying activator fluid to the adhesive coated on the upper face of the jacketing 28 passing thereunder. Accuracy of the spray is governed by the flat spray type nozzle 124 and must be capable of maintaining one longitudinal marginal edge of the surface of the jacketing 28 dry while thoroughly wetting the opposite marginal edge. Control of the amount and dispersion of the activator fluid is accomplished through use of a constant head of activator fluid pressure on the nozzle 124. Pressure of a low range, for example, 5 pounds gauge, is sufficient because of the accuracy of the nozzle orifice through which the fluid passes. Supply of activator fluid to the nozzle is provided by a line 138 from an associated constant pressure source, not illustrated. use of a spray nozzle 124 assures a dry margin on the edge of the jacketing 28 opposite that being sprayed to produce the tab 132, illustrated in FIG. 4, on the finished product when the jacketing is wrapped on the tubes 14.

Clearly, there are alternative apparatus for the pickup-spray station 32; for example, the activator could be brushed or rolled into the jacketing 28 and the jacketing 28 could be pulled from a stationary stack by an overhead rotating friction contact or the like. Further, adhesive could be applied to the jacketing 28 instead of activator, and while bonding between the jacketing 28 and tube 14 is enhanced by adhesive over the entire face of the jacket, exclusive of the tab 132, it is sufficient if only the edge opposite the tab 132 and the area immediately adjacent the tab 132 have adhesive to produce the wrapped tube product. At least one third the periphery of the tube 14 to be covered should be bonded to the jacketing 28 with adhesive.

Overlapping the pickup-spray station 32 and the wrapping station 24 is a jacketing conveyor 34 illustrated in FIGS. 1 through 4, and 8. Three conveyor type belts 134 wrapped in a continuous loop around drive drum 136 and idlers 138 and 140 in conjunction with three similar but shorter conveyor type belts 142 forming a continuous loop about drive drum 144 and idlers 146 and 148 form the jacketing conveyor 34. All of the drums 136, 138, 140, 144, 146 and 148 are rotatably mounted having stub shafts in pillow block bearings supported by the base 42. Conveying of the jacketing 28 from the stacking station 30 is aided by a plenum 150 beneath the shorter belt 142 portion of the jacketing conveyor 34. A negative pressure within the plenum 150 draws the jacketing to the belts 142 upon release by the vacuum cups 104. The plenum 150 is typically connected to a negative pressure source (not illustrated) by a flexible hose 152.

Travel of jacketing 28 on the jacketing conveyor 34 is accomplished in steps with the leading end of the jacketing energizing a photo cell 154 to stop the conveyor 34 when a jacketing sheet 156 has reached the position illustrated in FIG. 4 downstream of the pickup-spray station. Reactivation of the conveyor 34 occurs when the previous tube 14 has cleared the wrapping station 24 resulting in a start stop operation. The position illustrated by jacketing sheet 156 is a dwell position which furnishes sufficient time for activation of the adhesive on the sheet 156, resulting from wetting by the activator fluid, to cause the adhesive to become tacky. When a subsequent sheet is advanced to the dwell position and stopped by the photo cell 154, the sheet formerly in the dwell position is advanced into the wrapping station 24 and stopped. Splitting the jacketing conveyor into two loops consisting of the long belts 134 and the short belts 142 results in an independent loop consisting of short belts 142 serving the pickup and spray station. Preferably, the short belts 142 are run at a constant speed which is coordinated with the spray of activator fluid, also an established constant, to cause a constant volume of activator fluid to be deposited per unit area of adhesive coated jacketing 28 wetted. Further, greater flexibility is available in that the speed of the longer belts 134 can be varied independently of the speed of the shorter belts 142.

Adjustment of tension on the jacketing conveyor 34 is enhanced by the idler drums 140 on the belts 134 and 142, respectively, which allow the belts 134 and 142 to be tensioned without moving the drums 136, 138, 144 and 148 aligned with the line equipment and having spaced relations thereto. Energization of the longer belts 134 is provided by a motor 158, illustrated in FIG. 1, connected to drive drum 136 through a magnetic clutch brake combination 160 driving a reducer 162 connected to a chain and sprocket loop 164. The above drive components are fixedly secured to the base 42. The magnetic clutch-brake 160 allows the conveyor to be stopped with accuracy while the motor 158 continues to run.

Driving the short belts 142 is a motor-reducer acting through a chain and sprocket loop 165 on drive drum 144 as illustrated in FIG. 2.

As pointed out above, adhesive could be applied to the sheets at the spray station 32 instead of activator fluid thereby also altering the jacketing conveyor 34 by eliminating the dwell portion. Also, other means of conveying the jackets into the wrapping machine could be used; for example, a roller hearth could be used in place of a conveyor.

Figure 8:
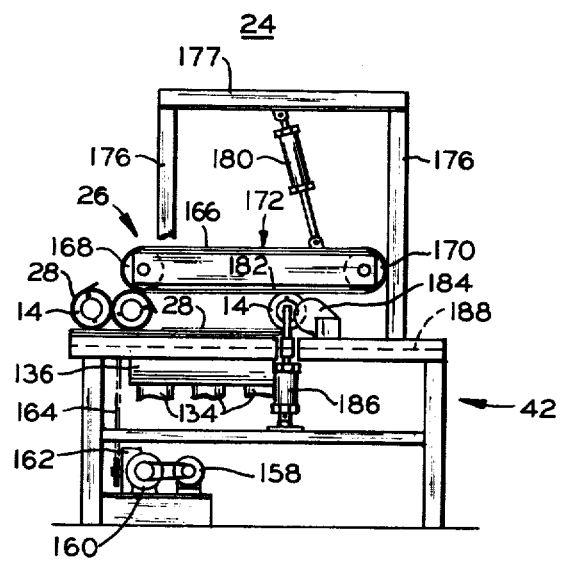
FIG. 8 is a sectional view of the apparatus illustrated in FIG. 1 taken along line 8—8 thereof.
Figure 9:
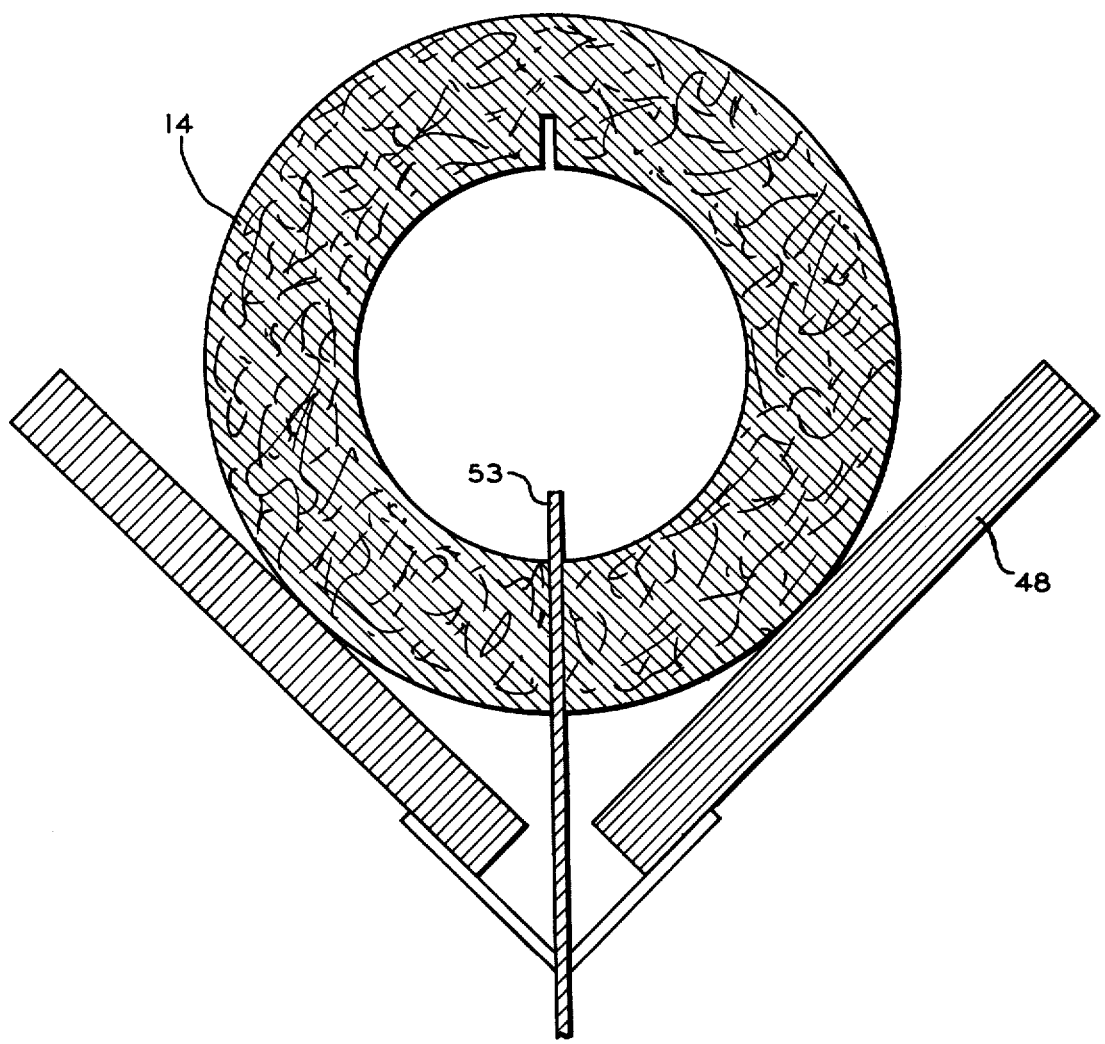
FIG. 9 is an enlarged fragmentary sectional view of the apparatus illustrated in FIG. 1 taken along line 9—9 thereof.

Having described the apparatus illustrated for handling the flow of the tubes 14 and the jacketing 28, attention will now be turned to the wrapping station 24 where the tubes 14 and the jacketing 28 are assembled. The wrapping station 24 is illustrated in FIGS. 1, 3 and 8 and includes a swingable belt conveyor 26 having a series of flat belts 166 wrapping a drive roll 168 and an idler roll 170 in continuous loops. Both rolls 168 and 170 are journaled to a box frame structure 172, which, in turn, is pivotally to the base 142 as at 174. The base 42 also supports spaced apart vertically extending columns 176. A bracket 178 is supported by cross ties 177 (see FIG. 8) spanning the columns 176. Pivotally suspended from the bracket 178 is an air cylinder 180. The rod end of the cylinder 180 is pivotally connected to the box frame 172 at the end opposite the pivoted connections 174 to enable the swingable belt conveyor 26 to swing about the connections 174 as the cylinder 180 is operated. With the cylinder 180 in a position where the cylinder 180 rod is extended, FIG. 8 illustrates that the conveyor 26 contacts the outer peripheral surface of the tube 14. When the cylinder 180 rod is retracted, the conveyor 26 is swung clear to allow the tube 14 to enter the wrapping station 24. Proper orientation of the tube 14 is maintained by retractable guide 182 which engages the slot in the tube 14 upon its entering the wrapping station 24. Upon contact of the entering tube 14 with a flag 184, a limit switch, not illustrated, is activated causing an air cylinder 186 to which the retractable guide 182 is affixed to retract the guide 182 beneath the bed 188 of the wrapping station 24. At the same time, cylinder 180 is extended to allow the swingable conveyor 26 to engage the tube 14 which is free to roll under the frictional contact between it and the moving belts 166. The bed 188 provides rigid support for both the jacketing conveyor belts 134 passing thereover and the jacketing 28 on the belts 134. Indirectly, the bed 188 also provides support for the tube 14 as it rolls over the jacketing 28. With the tube 14 supported as described above, pressure can be exerted on the tube 14 by the swingable conveyor 26. Application of pressure as the tube 14 is rolled prevents slippage between the tube and conveyor 26 to assure that the alignment of the edge of the jacketing 28 with the slot in the tube 14 is maintained. Further assurance that the tube 14 is rolled over the entire surface of the jacketing 28 is provided by preventing slippage between the tube 14 and conveyor 26. Since the upper surface of the jacketing 28 is tacky upon entering the wrapping station 24, the jacketing 28 is picked up by the tube 14 as it rolls. After a half revolution of the tube 14, the jacketing 28 on the tube 14 is engaged by the swingable conveyor 26 to complete a full revolution of the tube 14 thereby completing the wrapping process. The tubes 14 are discharged in sequence with each subsequent tube 14 pushing the prior tube 14 from the end of the swingable conveyor 26 to be removed or dropped from the bed 188 to a collector. Movement of the swingable conveyor belts 166 is provided by a motor-reducer 190 supported by the columns 176 operating through a chain and sprocket loop 192 to drive the drive roll 168.

Other means of energization are available in place of a motor-reducer 190 and cylinders 180 and 186 such as a hydraulic motor and rack and pinion drive, respectively.

The method of operation of the above apparatus is to coordinate the simultaneous flow of the tubes 14 with the flow of the jacketing 28 to bring them together for assembly in the wrapping station 24. Assuming the line is in continuous operation, a sheet of jacketing 28 will be positioned at the dwell portion of the jacketing conveyor 34 and the inclined ramp 12 will have the tubes 14 stored thereon. Upon a predetermined signal, a tube 14 is released from the inclined ramp 12 and deposited in the trough 16 and 48 (see FIGS. 1 and 3). Immediately, the tube 14 is advanced to the entry of the slitter station 20 by the continuously rotating forwarding wheel 18 where the leading edge of the tube 14 abuts the stationary pressure belt 52 of the slitter station 20. The pressure belts 52 and 84 of the slitter and transfer stations 20 and 22 are activated in unison by a top limit switch, not illustrated, which is contacted by the swingable conveyor 26 when the conveyor 26 reaches its top position to provide clearance for a tube 14 to advance therebeneath. Advancement of the jacketing 28 from the dwell position by the jacketing conveyor 34 requires that the area into which the sheet is to be advanced be clear as indicated by the passing of a tube 14 over the prior sheet of jacketing 28 by contacting an end limit switch, not illustrated, at the discharge of the wrapping station 24. Activation of the jacketing conveyor 34 is accomplished by the end limit to assure that the receiving area is clear for the jacketing 28 being advanced.

Energization of the jacketing conveyor 34 is the last step in a sequence of motions which precede it to advance the jacketing 28 to the dwell position. Thus, each time the end limit switch is contacted by a tube 14 each step in the sequence is activated. Viewing the steps starting with stacking station 30 in the order in which they occur, FIGS. 2 and 4 illustrate the vaccum cups 104 positioned over the jacketing conveyor 34 from which position they swing over the stack of jacketing 28 on the stacking station 30. With the vacuum cups 104 activated, the stacking station 30 is elevated to meet the cups 104 with the top sheet of jacketing 28 being engaged by the cups 104 which have a vacuum drawn thereon. Next, the vacuum cups 104 are positioned over the jacketing conveyor 34 while the stacking station 30 is lowered, and the cups 104 are deactivated to release the sheet of jacketing 28 whose leading end falls onto the jacketing conveyor 34. Sufficient contact between the leading end of the jacketing 28 to carry the remainder of the sheet of jacketing 28 onto the conveyor 34, is supplied by the plenum 150 which has a negative pressure therein to draw the sheet of jacketing down against the jacketing conveyor 34. As the jacketing 28 is advanced by the jacketing conveyor 34, it passes the nozzle 124 of the pickup-spray station 32. A patterned flow from the nozzle sprays activator fluid on the upper face of the jacketing 28 to activate the adhesive thereon over the marginal edge of sheet 156 of FIG. 4 opposite the tab 132. As an alternative, the entire face with the exception of the tab 132 can be sprayed or the above marginal edge and one adjacent the tab 132 can be sprayed. The marginal edge is maintained free of activator by the accuracy of the nozzle to create a non tacky tab 132 on the jacketing sheet 156 which overlaps the slot in the tube 14 when the jacketing 28 is wrapped around it. From the pickup-spray station 32, the jacketing 28 is advanced to the dwell portion of the jacketing conveyor 34 where the leading edge of the jacketing sheet 156 energizes the photo cell 154 stopping the jacketing conveyor 34 and deactivating the spray nozzle 124. A sequence of steps has now resulted in a return to the jacketing 28 positioned in the dwell portion of the jacketing conveyor 34. With the top limit switch contacted by the swingable conveyor 26 of the wrapping station 24, the switch activates the slitter and transfer station 20 and 22 to advance the tube 14 being held against the entry of the slitter station 20 on into the wrapping station 24. As the tube 14 is advanced through the slitter station 20 the saw 50 cuts a slot through bottom wall of the tube 14 and partially through the diametrically opposed inner wall. The tube is advanced through the saw 50 and the transfer station 22 by pressure belts 52 and 84, respectively, with the slot being engaged by a guide 53 subsequent to the saw 50, until being released from the transfer station 22. As the tube 14 is advanced to the wrapping station 24, the sheet 156 of jacketing 28 is advanced from the dwell portion of the jacketing conveyor 34. Stoppage of the jacketing conveyor 34 by a subsequent sheet 156 of jacketing entering the dwell portion thereof stops and aligns the sheet 156 of jacketing 28 which has entered the wrapping station 24 so that the ends of the sheet 156 and the ends of the tube 14 are adjacent each other. Location of the tube 14 advancing into the wrapping station 24 is provided by contacting the flag 184. The tube 14 must advance to trip the flag 184 activating the flag limit switch (not shown) to cause the lowering of both the swingable belt conveyor 26 and retractable guide 182. The retractable guide 182 maintains the circumferential orientation of the tube 14 as it leaves the guide 53 which is within the transfer station 22 and aids in guiding the alignment of the jacketing 28. Retraction of the guide 182, therefore, leaves the tube free to roll under the contact of the moving belts 166 of the swingable conveyor 26. With both tube 14 and jacketing 28 having been aligned within the wrapping station 24, rolling of the tube 14 over the tacky surface of the jacketing 28 resulted in the jacketing 28 being wrapped about the tube 14 with the longitudinal edge of the jacketing 28 adjacent the tube 14 slot mating with the edge of the slot. The operation ends with the tubes 14 wrapped with jacketing 28 being discharged to the bed 188 of the wrapping station 24 and the swingable conveyor 26 and retractable guide 182 being returned to their raised positions upon the discharged tube contacting the end limit switch.

While the above method has been described with respect to the preferred embodiment it is to be understood that the method of indexing the tubes and sheet material and the stps of aligning and wrapping the tubes could be performed other than on the present apparatus and even manually with the aid of guiding means.

The precut size of the jacketing 28 and the width of the tab 132 left unactivated determine the overlap of jacketing to provide a readily activated adhesive tab 132 for sealing the slot of the finished product. If no excess is provided and the entire surface of the jacketing is wetted then the tube is covered without a tab 132 leaving the slot exposed unless an independent seal is later applied. The above apparatus is applicable to either concept.

Advantages of the above apparatus and method include a faster rate of production of wrapped tubes over previous manual wrapping with the wrapping process capable of matching the rate of production of tubes to eliminate a production bottle neck. The elimination of manual labor results in a reduction in labor cost as well as a savings in work area required.

In accordance with the provisions of the patent statutes, the principle and mode of operation of the machine have been explained and what is considered to represent its best embodiment has been illustrated and described. It should, however, be understood that the invention may be practiced otherwise than as specifically illustrated and described without departing from its spirit or scope.

I claim:

1. Apparatus for jacketing cylindrical bodies comprising:
    means for advancing a cylindrical body along a first path to wrapping station, said first path being parallel to the longitudinal axis of said cylindrical body;
    means for slitting at least one wall of said cylindrical body parallel to the longitudinal axis of said cylindrical body as it is advancing along the first path so as to produce a longitudinal slot;
    fixed guide means engagable within the slot of said cylindrical body to maintain a fixed circumferential orientation of the cylindrical body as it is passing from the slitting means to the wrapping station;
    extensible guide means at said wrapping station engagable within the slot of said cylindrical body; means for retracting said extensible guide means;
    means for advancing a tacky adhesively coated sheet of jacketing material along a second path in a direction toward said cylindrical body and said wrapping station;
    means including said extensible guide means for effecting contact between an edge portion of said sheet of jacketing material and the outer peripheral surface of the cylindrical body so that said edge portion is adjacent and in parallel alignment with the longitudinal slot of the cylindrical body,; and
    means for rotating the cylindrical body about its longitudinal axis in a direction substantially normal to the direction of advancement of the cylindrical body to effectively apply the sheet of jacketing material to the outer peripheral surface of the cylindrical body said rotating means being activated after said extensible guide means is retracted.

2. Apparatus defined in claim 1 wherein means is provided for forming said tacky adhesive coating on at least a portion of one surface of the sheet jacketing material.

3. Apparatus defined in claim 2 wherein said adhesive coating means includes a spray means for applying an activator fluid to wet at least a portion of a dormant adhesive coating on the surface of said sheet jacketing material to thereby cause the wetted portion to become said tacky adhesive coating.

4. Apparatus for jacketing tubular objects comprising:
    an inclined ramp for the tubular objects having a discharge end;
    means for slitting a wall portion of each of said tubular objects parallel to the longitudinal axis thereof so as to produce a longitudinal slot;
    a forwarding wheel adjacent the discharge end of said ramp for advancing said tubular objects to said slitting means in a direction parallel to their longitudinal axes;
    a wrapping station;
    guide means extending between said forwarding wheel and said wrapping station for advancing and maintaining circumferential orientation of said tubular objects, said guide means including a trough, an associated conveyor belt, and a fixed guide engagable within the longitudinal slots of said tubular objects;
    extensible guide means at said wrapping station engagable within the slots of said tubular objects;
    means for retracting said extensible guide means;
    means for stacking a supply of sheet jacketing material having a coating of dormant adhesive on one surface thereof;
    means for moving individual sheets of jacketing material from the supply to said wrapping station, said moving means including a sheet pick-up means, and associated sheet conveyor means;
    spray means disposed between said sheet pickup means and said wrapping station for applying activator fluid to at least a portion of the dormant adhesive on said individual sheets of jacketing material; and means at said wrapping station for wrapping said individual sheets of jacketing material about the outer peripheral surface of said tubular objects, said wrapping means including a conveyor belt assembly having means for effecting selective engagement with said tubular objects to effect rotation of said tubular objects about their longitudinal axes upon retraction of said extensible guide means.

* * * * *